United States Patent [19]

Edwards, Jr. et al.

[11] 4,433,776
[45] Feb. 28, 1984

[54] DRIVEN ROLLER TUBE CONVEYOR

[75] Inventors: Ralston G. Edwards, Jr., Newfield; John R. B. Walkden; Walter H. Carstensen, both of Vineland; Gregory E. Murphy, Erial; John E. Lisi, Newfield, all of N.J.

[73] Assignee: Owens-Illinois, Inc., Toledo, Ohio

[21] Appl. No.: 280,579

[22] Filed: Jul. 6, 1981

[51] Int. Cl.³ ............................................. B65A 17/24
[52] U.S. Cl. .................................................. 198/779
[58] Field of Search ............... 198/779, 789, 790, 781, 198/377, 411, 415, 394; 65/275, 286

[56] References Cited

U.S. PATENT DOCUMENTS 3,722,657  3/1973  Kienle et al. ...................... 198/394
4,103,516  8/1978  Marcin ............................... 198/781

*Primary Examiner*—Joseph E. Valenza
*Assistant Examiner*—Dennis J. Williamson
*Attorney, Agent, or Firm*—John R. Nelson; Myron E. Click

[57] ABSTRACT

A conveyor apparatus for receiving and transporting cylindrical stock or articles past work stations includes a plurality of rollers disposed along spaced-apart parallel axes. The rollers are driven through one-way or overrunning clutches and rotate cylindrical stock disposed between adjacent pairs of rollers. At a work station, a moving member such as a belt engages the stock and rotates it at a speed higher than the speed imparted to it by the rollers. The overrunning clutches release the conveyor rollers and rotate with the stock at a correspondingly higher speed. The constant, non-slipping contact between the rollers and stock minimizes such difficulties as scoring of the stock and significantly improves product quality and appearance.

16 Claims, 3 Drawing Figures

DRIVEN ROLLER TUBE CONVEYOR

BACKGROUND OF THE INVENTION

The invention relates generally to stock transporting conveyors and more particularly to roller conveyors utilized to receive and rotatingly transport cylindrical stock.

The transportation of objects on longitudinally translating conveyors is perhaps the most commonly utilized scheme for transporting material and partially fabricated products from work station to work station on a production line. Frequently, the conveyor will form a component of the work station in that the product will remain supported on the conveyor during a fabrication step. Furthermore, rotation may be imparted to the product as it translates along the conveyor by driving the conveyor rollers upon which the work rests in order to ensure uniform application of heat, material coatings, or for similar process steps. For example, a given forming operation may require that an article be uniformly heated prior to arriving at a given forming station. Rotating the article while it is translating past various gas or infrared heaters disposed along the conveyor assembly will conveniently achieve this goal. Co-owned U.S. Pat. No. 3,257,186 discloses such a device and function.

A similar approach may be utilized to permit rapid inspection of the entire circumference of a cylindrical container. In U.S. Pat. No. 3,901,381, vertically oriented ware translating on a horizontal conveyor is rotated at an inspection station by opposed, rapidly moving belts.

A forming operation which requires torque or rotational speed in excess of that which can be transferred to the rotating article simply by gravitational contact with the conveyor rollers may necessitate additional componentry. If simply additional torque is required, frictional contact between the rotating articles and the conveyor rollers may be improved by increasing the contact force. A stationary member disposed above the conveyor rollers which engages the upper portions of the articles may be utilized to do so. Naturally, if precautions are not taken, sliding contact between this member and the articles may deface or damage the outside surface thereof. In the second instance, if higher speeds are required, a moving wheel or belt may be utilized to engage the articles from above and rotate them at such a higher desired speed. In most instances, the conveyor rollers will be fabricated of steel or other durable material and damage from scoring or other abrasion will almost invariably result from the sliding of the article against the slower moving conveyor rollers as it rotates.

This specific situation exists in horizontal glass production and tooling lines. Elongate cylindrical glass articles are rotated and simultaneously translated along a roller conveyor past various heating and forming stations. Typically, at least one of these forming stations necessitates the rotation of the articles at a speed greater than that imparted to them by the rotating conveyor rollers. Such higher speed rotation is provided by a rotating wheel or belt disposed above the conveyor assembly at the desired location which serially engages the articles and rotates them at a speed faster than the speed imparted by the conveyor rollers. Generally speaking, the conveyor rollers, due to their exposure to relatively high temperatures, must be fabricated of a hard durable material, preferably metal. The higher speed rotation of the glass articles against the conveyor rollers invariably results in scoring and aesthetic degradation of the exterior surface of the articles.

SUMMARY OF THE INVENTION

The instant invention comprises a roller conveyor apparatus for receiving and transporting cylindrical articles as they are transported past work stations which necessitate the rotation of the cylindrical articles at a speed higher than the speed imparted to them by the rotation of the conveyor rollers. The conveyor rollers are disposed on spaced-apart parallel shafts. The shafts are supported for rotation in adjacent interconnected structures which translate along a conveyor supporting platform. Each of the rollers may be a solid cylinder or comprise plural, spaced-apart discs which engage the articles and includes a chain drive sprocket which engages a chain coextensively disposed on the conveyor supporting platform. As the conveyor rollers translate along the platform, the chain may be independently translated to maintain the rollers in a stationary position or rotate them at a selected speed. A one-way or overrunning clutch assembly is operably disposed between the chain sprocket and each conveyor roller or plurality of rollers disposed upon a common shaft. A drive member such as a wheel or belt is appropriately disposed above the conveyor assembly at a desired location, such as a tooling station, and engages the articles, rotating them at a speed higher than the speed imparted to them by the conveyor rollers. When urged to turn at a speed higher than the speed at which the chain is driving them, the overrunning clutches disposed between the rollers and the drive sprockets release and allow the conveyor rollers to free wheel at the speed of rotation dictated by the rotating stock or article, thus eliminating sliding contact between the conveyor rollers and the article and possible damage resulting therefrom.

Thus it is an object of the instant invention to provide a translating conveyor having rotating rollers driven through overrunning clutch devices.

It is a further object of the instant invention to provide a roller conveyor apparatus having both an overrunning conveyor roller drive for a rotating cylindrical object supported by the conveyor roller and auxiliary drive means for rotating such objects at a speed different from that speed imparted by the conveyor rollers.

It is a still further object of the instant invention to provide a roller conveyor apparatus having rollers which are driven at a first speed and which free wheel when overdriven at a second, faster speed thereby minimizing or eliminating scoring or other damage to the outside surface of the articles.

Still further objects and advantages of the instant invention will become apparent by reference to the following specification and appended drawings.

DESCRIPTION OF THE PREFERRED EMBODIMENT

Figure 1:
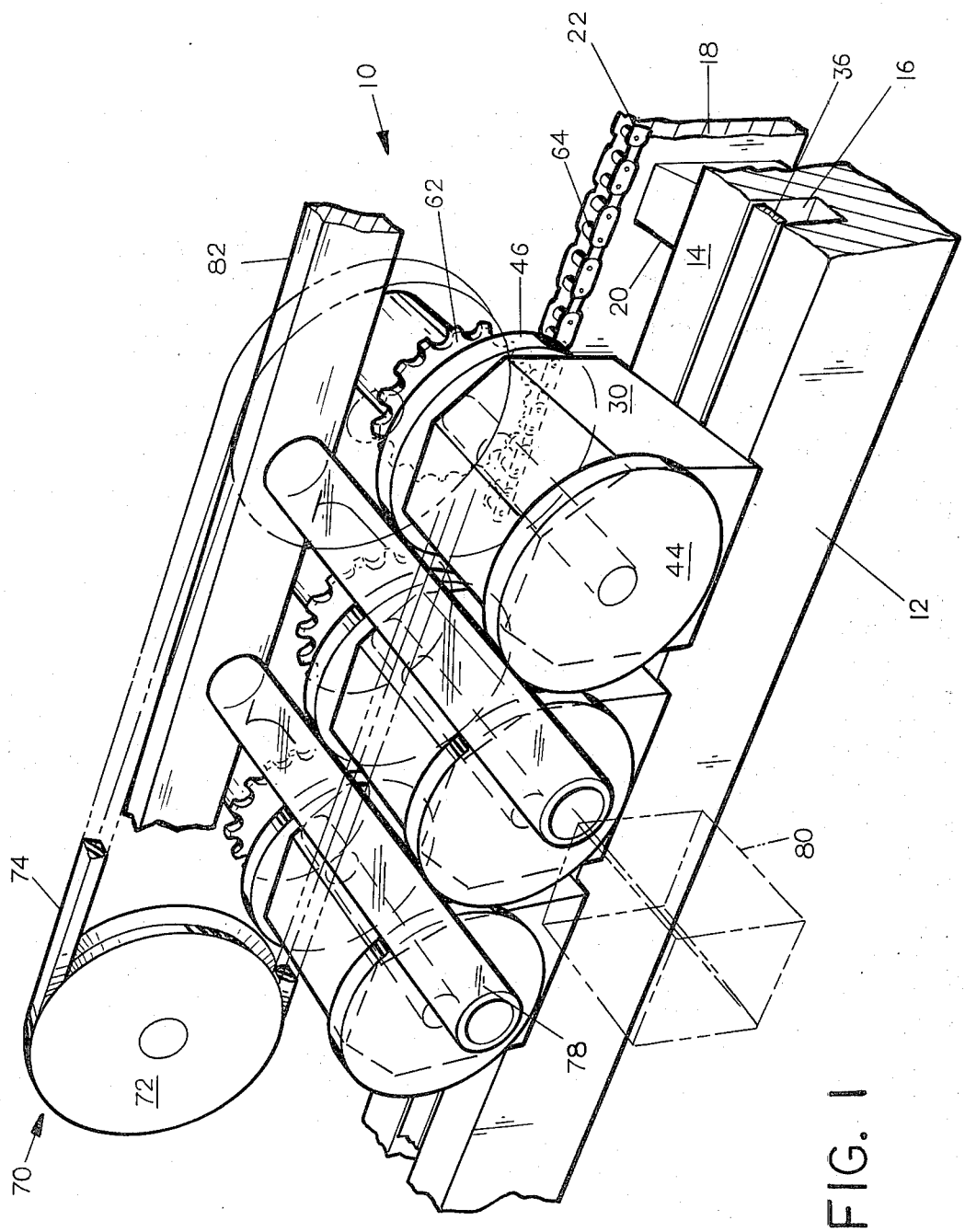
FIG. 1 is a fragmentary perspective view of an article conveyor according to the instant invention.

Referring now to FIG. 1, a roller conveyor according to the instant invention is illustrated and generally designated by the reference numeral 10. The roller conveyor 10 includes a horizontally extending beam 12 which defines a smooth upper surface 14. The beam 12 also defines a longitudinally extending re-entrant channel 16. The channel 16 is preferably positioned such that it substantially equally divides the upper surface 14. The purpose of the channel 16 will be described subsequently. A longitudinally extending support rail 18 is disposed in parallel, coextensive relationship with the beam 12. The support rail 18 may be spaced from and secured to the beam 12 by suitable stand-offs or spacers 20 and appropriate fastening means such as threaded fasteners, weldments or other means not illustrated. The support rail 18 defines a smooth upper surface 22.

Figure 3:
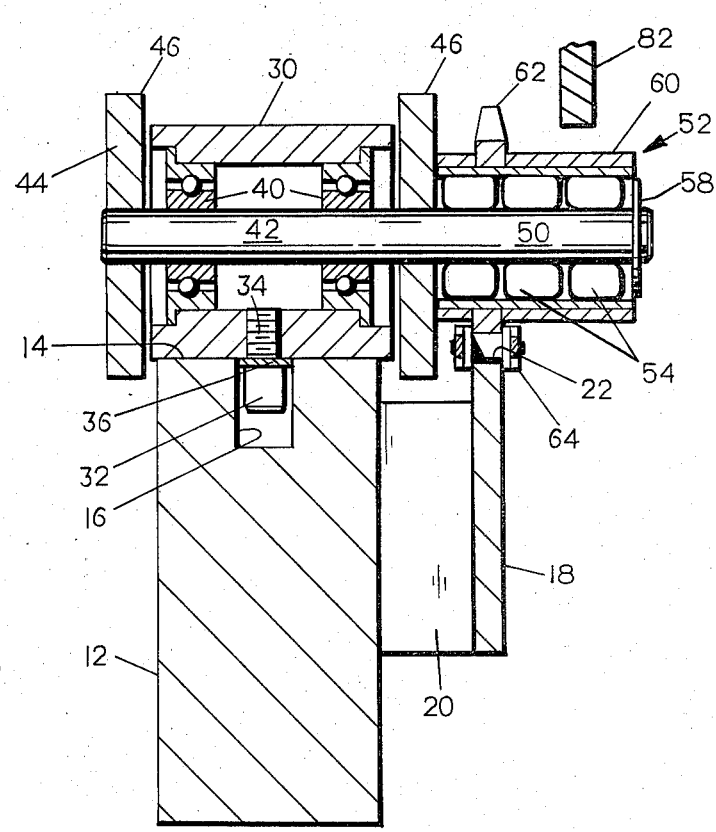
FIG. 3 is a full sectional view of an article conveyor according to the instant invention taken along line 3—3 of FIG. 2.

Referring now to FIGS. 1 and 3, the roller conveyor 10 also includes a plurality of longitudinally translating carriage blocks 30. The carriage blocks 30 are disposed for sliding translation along the upper surface 14 of the beam 12 and each includes a selectively removable fastener 32 which seats within a suitable opening 34 in the carriage block 30. The fastener 32 secures a longitudinally extending, flexible endless drive band 36 to the carriage block 30. The drive band 36 is a continuous member which translates along the beam 12 and transfers translational energy from a suitable drive means (not illustrated) to the carriage blocks 30. Various other linear drive configurations such as a chain drive are well known in the art and may be used in place of the drive band 36 illustrated.

Each of the carriage blocks 30 provides suitable mounting for anti-friction devices such as a pair of ball bearings 40. The ball bearings 40 in turn, provide rotational mounting for a transversely extending stub shaft 42. Secured to the stub shaft 42 by suitable means such as an interference fit or fasteners at respective locations adjacent the transverse ends of the carriage block 30 are a pair of equal diameter roller discs 44. The discs 44 each define circular peripheral surfaces 46. The selection and utilization of a pair of roller discs 44 or, alternatively, a single, elongate roller or a greater plurality of roller discs 44 on each stub shaft 42 will generally be dictated by the application of the roller conveyor 10. Thus it should be apparent that the configuration illustrated is exemplary and that the invention should be construed to include all functionally equivalent roller arrangements.

The stub shaft 42 defines a cylindrical surface 50 about which an overrunning or one-way clutch assembly 52 is concentrically disposed. The overrunning clutch assembly 52 may be a sprag or roller type and preferably extends axially along a significant portion of the cylindrical surface 50 in order to evenly distribute bending moments associated with the mechanical configuration. This may, of course, be achieved by the utilization of plural, narrow overrunning clutch mechanisms 54 as illustrated or, alternatively, a lesser number of wider mechanisms. In either event, the overrunning clutch assembly 52 is deemed to be well known in the art and due to this fact, will not be further described. The overrunning clutch assembly 52 is axially restrained upon the cylindrical surface 50 by means of a suitable retaining ring 58 or similar fastener disposed in a circumferential groove (not illustrated) in the cylindrical surface 50. The overrunning clutch assembly 52 is securely disposed within and provides mounting for a cylindrical drive housing 60. Disposed about the periphery of the drive housing 60 in vertical alignment with the support rail 18 are a plurality of chain receiving teeth which define a chain drive sprocket 62. An endless drive chain 64 supported upon the upper surface 22 of the support rail 18 engages the chain drive sprocket 62. The drive chain 64, in an arrangement similar to the drive band 36, extends longitudinally the full length of the beam 12 and engages a variable speed drive means (not illustrated) which circulates the drive chain 64 at a preselected speed.

Figure 2:
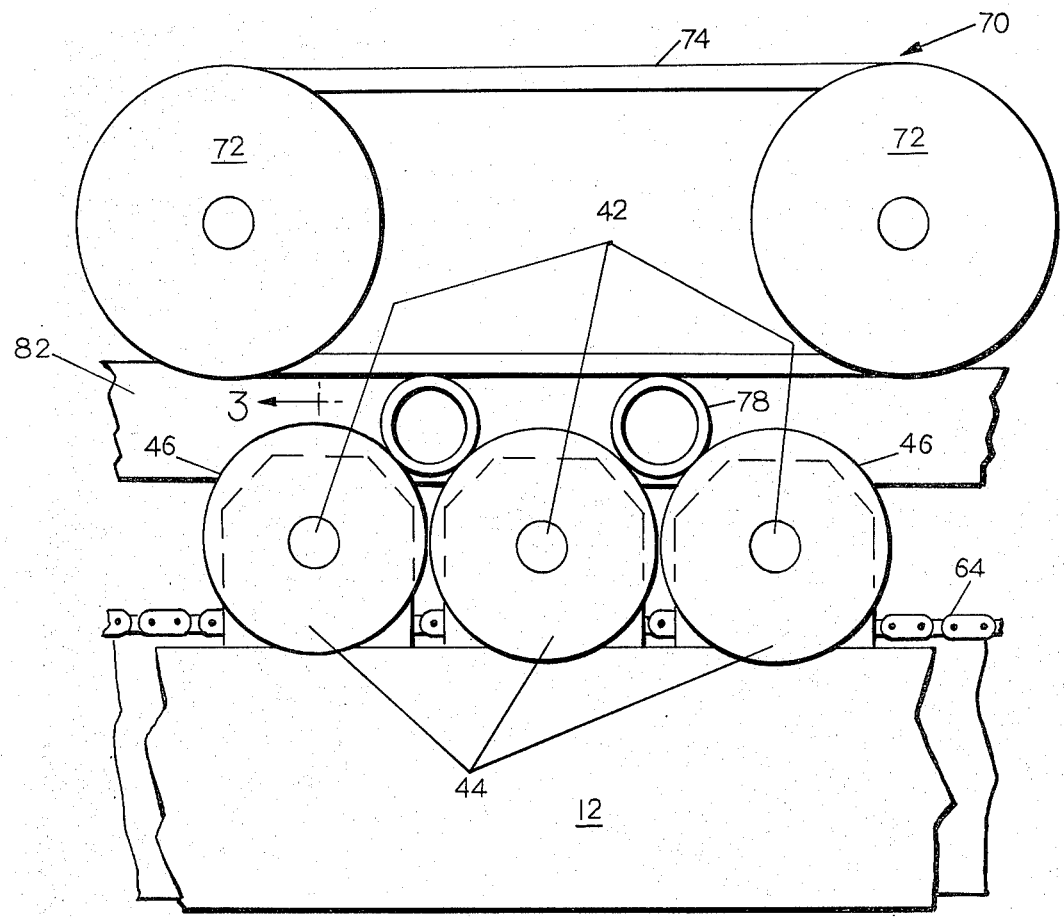
FIG. 2 is a fragmentary side elevational view of an article conveyor and work station incorporating the instant invention.

Referring now to FIGS. 1 and 2, an auxiliary drive assembly 70 is disposed above the beam 12 and preferably includes a pair of pulleys 72. The pulleys 72 are disposed for rotation about stationary axes disposed above and parallel to the axes of rotation of the stub shafts 42 and transverse to the direction of translation of the carriage blocks 30. A drive means (not illustrated) provides rotational energy to at least one of the pulleys 72 which in turn causes circulation of a belt 74 disposed thereabout. Preferably, the pulleys 72 and drive belt 74 are disposed substantially medially between pairs of the roller discs 44 disposed on the stub shafts 42. The drive assembly 70 is positioned longitudinally along the roller conveyor 10 at a location where it is necessary to increase the rotational speed of cylindrical stock such as articles 78 supported between adjacent pairs of circular peripheral surfaces 46 on the roller discs 44 in order to facilitate a fabrication or finishing process. Thus, a mechanism 80 for tooling, forming, cutting, polishing, finishing, painting, or other fabrication or finishing step will also be positioned at the situs of the drive assembly 70. The fabricating mechanism 80 is schematically illustrated by the phantom line enclosure. A longitudinally extending backstop 82 is disposed generally above the support rail 18 and provides a fixed reference surface against which the articles 78 may abut.

The operation of the roller conveyor 10 according to the instant invention will now be described with reference to all of the drawing figures. As generally stated previously, the carriage blocks 30 translate along the upper surface 14 of the beam 12, past various forming, heating and other fabrication mechanisms, one of which is illustrated in FIG. 1 and designated by the reference numeral 80. Cylindrical stock such as glass tubing or other articles 78 are supported slightly above the nip of adjacent pairs of roller discs 44. As the carriage blocks 30 and thus the articles 78 translate along the beam 12, the drive chain 64 may be translated to cause rotation of the drive sprocket 62, the roller discs 44 and thus the articles 78 disposed therebetween. As a specific example, assume the drive band 36 is moving from right to left in FIG. 1 and that the drive chain 64 is moving in the opposite direction. The mounting blocks 30 will thus move from right to left and the roller discs 44 will rotate in a counter-clockwise direction, rotating the articles 78 supported thereby in a clockwise direction. In this mode of operation, the overrunning clutch assembly 52 is locked together to transfer power from the drive sprocket 62 to the cylindrical surface 50 of the stub shaft 42. The pulleys 72 rotate in a counter-clockwise direction and the surface speed of the belt 74 of the drive assembly 70 is greater than the rotating surface speed of the roller discs 44 and thus equally greater than the surface speed of the articles 78 supported by the roller discs 44. As the articles 78 translate into the region of the drive assembly 70 and mechanism 80, they are engaged by the belt 74 and are accelerated such that the surface speed of the articles 78 equals the surface speed of the belt 74. Frictional contact between the articles 78 and the roller discs 44 likewise causes the discs 44 and the stub shafts 42 to increase their speed of rotation correspondingly. At this time, the overrunning clutch assembly 52 releases and frees the stub shaft 42 and the roller discs 44 from the rotational drive provided by the drive chain 64. Thus the articles 78 are free to rotate at a speed dictated by the surface speed of the belt 74 in order to facilitate a given fabrication step by the mechanism 80. Since the roller discs 44 increase their rotational speed such that nonslipping contact is achieved with the articles 78, damage such as scoring of the articles 78 due to surface speed disparities between the articles 78 and the roller discs 44 is minimized or eliminated.

The foregoing disclosure is the best mode devised by the inventors for practicing this invention. It is apparent, however, that devices incorporating modifications and variations will be obvious to one skilled in the art of production conveyors. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What is claimed is:

1. A roller conveyor comprising, in combination, a plurality of rollers supported for rotation about parallel, spaced-apart axes, means for translating said rollers along an axis generally perpendicular to said spaced-apart axes, means for driving said rollers at a reference surface speed, and means operably disposed intermediate said drive means and said rollers for rotationally coupling said rollers to said drive means upon relative rotation therebetween in one direction and rotationally releasing said rollers from said drive means upon relative rotation therebetween in the opposite direction.

2. The roller conveyor of claim 1 in which elongate cylindrical glass stock are disposed between adjacent pairs of rollers and the stock is rotated and translated on the conveyor.

3. The roller conveyor of claim 1 further including means disposed adjacent said roller conveyor for rotating articles disposed on said roller conveyor at a surface speed greater than said reference surface speed.

4. A roller conveyor for translating and rotating glass tube stock for tooling finishing on an end of each stock, the conveyor comprising, in combination, a plurality of rollers supported for rotation about parallel, spaced-apart axes, means for translating said rollers along an axis generally perpendicular to said spaced-apart axes, means for driving said rollers at a reference surface speed, means operably disposed intermediate said drive means and said rollers for rotationally coupling said rollers to said drive means upon relative rotation therebetween in one direction and rotationally releasing said rollers from said drive means upon relative rotation therebetween in the opposite direction, and means disposed adjacent said roller conveyor for rotating articles disposed on said roller conveyor at a surface speed greater than said reference surface speed.

5. The roller conveyor of claim 4 further including a shaft secured to at least one of said plurality of rollers, a mounting carriage for rotatably supporting said shaft and said one of said rollers and means for translating said carriage, said shaft and said one of said rollers along an axis generally perpendicular to said axes.

6. The roller conveyor of claim 5 wherein said means is an overrunning clutch assembly.

7. A roller conveyor comprising, in combination, a plurality of rollers supported for rotation about parallel, spaced-apart axes, means for translating said rollers along an axis generally perpendicular to said spaced-apart axes, means for driving said rollers at a reference surface speed, means operably disposed intermediate said drive means and said rollers for rotationally coupling said rollers to said drive means upon relative rotation therebetween in one direction and rotationally releasing said rollers from said drive means upon relative rotation therebetween in the opposite direction, and means disposed adjacent said roller conveyor for rotating articles disposed on said roller conveyor at a surface speed greater than said reference surface speed.

8. The roller conveyor of claim 7 wherein said article rotating means includes a belt disposed for circulation between at least a pair of pulleys and means for rotationally driving at least one of said pulleys.

9. The roller conveyor of claim 7 further including a plurality of mounting carriages rotatably supporting at least one of said plurality of rollers and wherein said roller translating means includes a flexible member secured between adjacent mounting carriages.

10. The roller conveyor of claim 7 wherein at least two of said rollers have a diameter greater than their thickness and are disposed in spaced-apart relationship along one of said spaced-apart axes.

11. The roller convey of claim 7 wherein said means is an overrunning clutch assembly.

12. The roller conveyor of claim 7 wherein said roller driving means includes a chain sprocket operably coupled to said coupling means and a drive chain engaged with said chain sprocket.

13. A method of conveying and rotating tube stock for tooling finishing on an end of each of the stock, the method comprising the steps of:
A. rotating the tube stock with rollers that are rotated with a predetermined surface speed by means of a drive,
B. disengaging the drive from the rollers to allow the rollers to rotate freely, and
C. rotating the stock faster for tooling finishing to provide constant non-slipping contact between the stock and rollers to reduce abrasion and improve tooled finish appearance and quality.

14. A method as defined in claim 13 in which the stock is heated before step B.

15. A method as defined in claim 13 in which steps B and C are performed simultaneously.

16. A method of moving glass tubes by translating and rotating each tube prior to forming an end finishing operation on the tube, the method comprising the steps of:
A. conveying glass tubes in a generally horizontal path by means of rotating conveyor rollers and a drive for the rollers,
B. rotating each tube in the nip between two adjacent rollers,
C. heating each tube prior to the end finishing operation,
D. rotating the tubes at a rate faster than that of step B just prior to the end finishing operation, and
E. disengaging the drive from the rollers to allow the rollers to rotate faster and maintain a constant and non-slipping contact with the tubes.

* * * * *

UNITED STATES PATENT OFFICE
CERTIFICATE OF CORRECTION

PATENT NO. : 4,433,776
DATED : Feb. 28, 1984
INVENTOR(S) : Ralston G. Edwards, et al.

It is certified that error appears in the above-identified patent and that said Letters Patent are hereby corrected as shown below:

"Indicated claims 13-16 are to be omitted from the patent as they were printed in error."

On the title page, "16 Claims" should read -- 12 Claims --.

Signed and Sealed this

Fifteenth Day of January 1985

[SEAL]

Attest:

GERALD J. MOSSINGHOFF

Attesting Officer   Commissioner of Patents and Trademarks